United States Patent [19]

Sand

[11] 4,316,427

[45] Feb. 23, 1982

[54] DEPLETION INDICATING MECHANISM FOR A STORAGE BIN

[75] Inventor: Robert H. Sand, Canton, Conn.

[73] Assignee: The Vulcan Radiator Company, South Windsor, Conn.

[21] Appl. No.: 164,184

[22] Filed: Jun. 30, 1980

[51] Int. Cl.$^3$ .............................................. B65D 91/00
[52] U.S. Cl. .................................................. 116/215
[58] Field of Search ................................ 277/215, 200

[56] References Cited

U.S. PATENT DOCUMENTS

| 2,098,471 | 11/1937 | Starks | 116/215 |
| 2,570,952 | 10/1951 | Hyland | 116/215 |
| 2,580,041 | 12/1951 | Neilson | 116/215 |
| 3,675,845 | 7/1972 | Scheerer | 116/215 |

Primary Examiner—Robert I. Smith
Attorney, Agent, or Firm—McCormick, Paulding and Huber

[57] ABSTRACT

A depletion indicating mechanism allows for visual inspection of the quantity of components contained in a storage bin. The storage bin is mounted on a fixed frame structure, such as a wall, and the bin is held in a tilted position in opposition to the gravitational force acting on the bin. A mechanism is responsive to the change of weight of the bin as the quantity of components is reduced so that angular displacement of the bin occurs. The mechanism amplifies the angular displacement of the bin into corresponding depletion measurements on a mechanical gauge which allows for visual inspection of an indicator to quickly determine the degree of bin depletion.

17 Claims, 6 Drawing Figures

DEPLETION INDICATING MECHANISM FOR A STORAGE BIN

BACKGROUND OF THE INVENTION

This invention relates to storage bins and deals more particularly with an improved storage bin which includes a mechanism for indicating depletion of the contents of the bin.

It is known to inventory the quantity of components left in a storage bin either by counting the components or weighing the bin with its contents and comparing that weight to the weight of a filled bin. When the number of components, or the weight differential drops to a predetermined value, it is time to reorder components and/or to refill the bin. Such inventory methods require a great deal of time with incipient personnel costs.

It is an object of this invention to provide a depletion indicating mechanism with a storage bin so attached to a wall or the like to provide for easy inspection of the quantity of components to determine when reordering or refilling is necessary.

SUMMARY OF THE INVENTION

This invention resides in an apparatus for indicating the depletion of the contents of a bin for storage of industrial components or the like. One embodiment of the invention includes a mechanism for attachment between a pivioted storage bin and a fixed frame structure, such as a wall, the bin being supported in a tilted position in opposition to the gravitational force acting on the bin. The support force varies in magnitude directly with the change in weight of the bin as the quantity of the contents within the bin changes. The support force allows the bin to tilt to a lower position upon an increase in weight, and raises the bin to a higher position of tilt upon a decrease in weight. The mechanism amplifies the angular displacement of the bin between the lower and higher positions of tilt into corresponding depletion measurements on a gauge. The mechanism includes a mechanical gauge which causes an indicator to move relative to a reference mark as the bin moves from one position to another. The displacement of the indicator reflects the change in the quantity of bin contents.

One feature of the invention is that the mechanism is adjustable to provide for predetermined bin "full" and bin "reload" positions. Adjustment of the support force of the mechanism is provided for in the indicating mechanism. When the support force is provided by a compression spring, either a change of spring length or replacement of the spring is all that is required for the mechanism to be adaptable to accommodate heavy or light parts.

Another feature of the invention is that the mechanism provides a visual method of quickly inventorying the quantity of contents within the bin.

DETAILED DESCRIPTION OF THE PREFERRED EMBODIMENT

(FIGS. 1-5)

Figure 1:
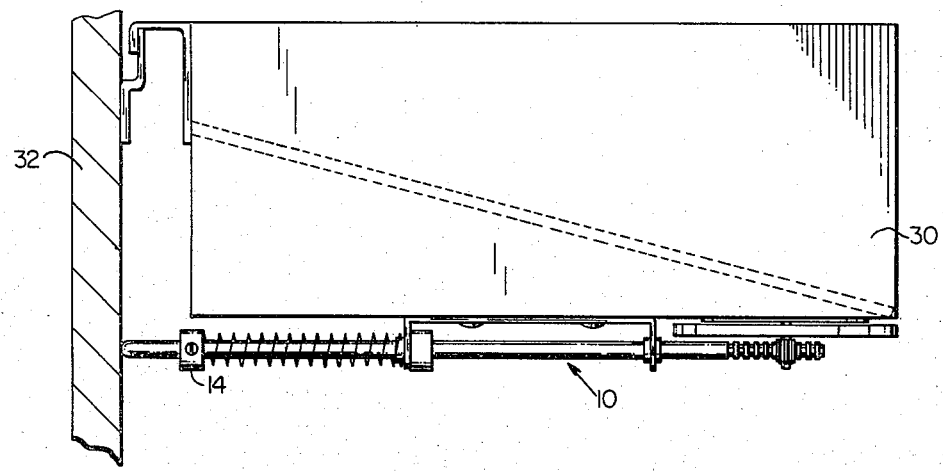
FIG. 1 is a plan view of a depletion indicating mechanism in an embodiment of the present invention.
Figure 2:
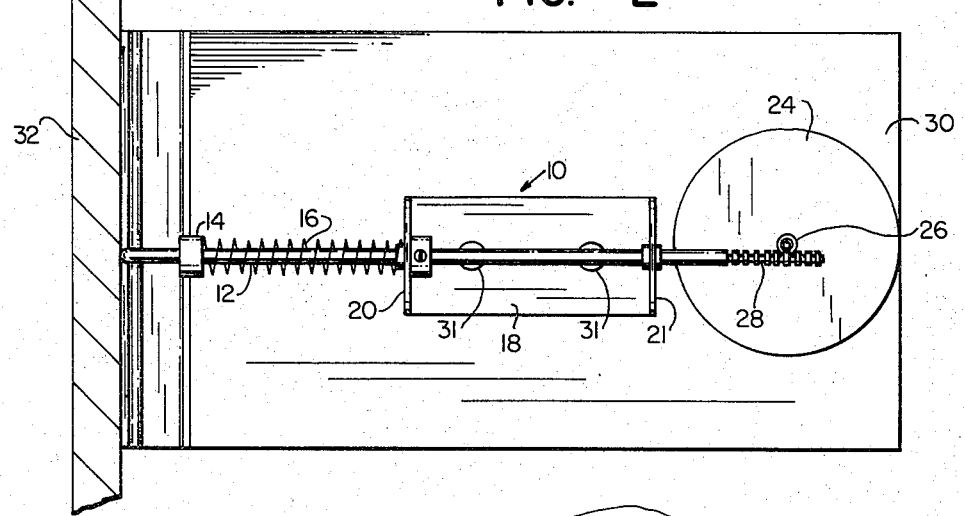
FIG. 2 is a side view as seen from the lower side of FIG. 1.

FIG. 1 illustrates an embodiment of the present invention generally designated as unit 10, adapted for attachment to a storage bin which is pivotally supported above its center of gravity in a fixed frame structure. The unit 10, when attached to a storage bin, acts between the storage bin and the fixed frame structure and supports the bin in a tilted position in opposition to the gravitational force acting on the bin. As shown in FIG. 2, unit 10 includes an elongated member 12, a mounting base 18, a spring 16, and an indicator wheel 24. The elongated member 12 is preferably made of metal, such as steel, which is rigid enough to be self-supportive and is capable of withstanding a compression force along its longitudinal axis equivalent to the gravitational force acting on the bin. A portion of the elongated member 12 near one of its ends has a camming surface 28 for pivoting the indicator wheel 24 about its center. An outwardly extending flange 14 is mounted on the elongated member 12 near its end opposite the end having the camming surface. A sleeve or bushing fixed upon the elongated member 12 provides the annular flange 14 against which one end of the spring 16 acts while supporting the bin in a tilted position. It is preferred that the sleeve be adjustable to various locations along the elongated member 12 for varying the force of the spring 16.

A portion of the mounting base 18 is in the form of a broad flat plate. The plate portion is preferably made of metal and lays flush against the bin when attached to it. The plate portion of the mounting base 18 may be suitably attached to a bin by bolts 31, 31 or screws. The plate portion includes a plurality of holes (not shown) to aid in the attachment of the unit 10 to a bin. The mounting base has collars 20, 21 attached to the same side of the base 18 and define co-aligned openings to loosely receive the elongated member 12. The defined openings in the collars 20, 21 are large enough to allow the elongated member 12 to slide therewithin in a longitudinal direction; that is, along the longitudinal axis of the elongated member 12. Since the inside surfaces of the collars 20, 21 will make sliding contact with the elongated member 12, it is preferable that the surfaces in contact be as smooth as possible to minimize friction during the sliding action.

Figure 3:
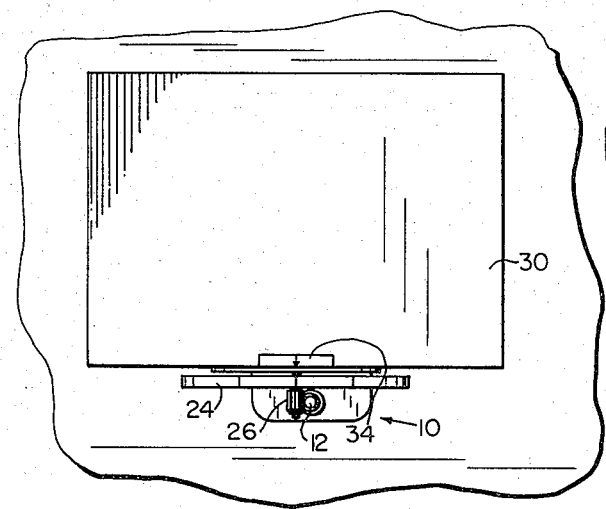
FIG. 3 is a side view as seen from the right of FIG. 1.

The indicator wheel 24 is in the form of a circular disc rotatably secured adjacent the mounting base 18. The wheel 24 is mounted by a pivot pin at its center to the bin 30 and the circular disc is generally parallel to the plate portion of the mounting base 18. A gear element, having a camming surface 26 in the form of teeth is defined on the wheel 24 and is located at the center of, and on the side of the wheel 24 opposite the bin 30. The camming surface 26 is coaxial to the wheel 24 and engages a complementary camming surface portion 28 of the elongated member 12. Thus, these camming surfaces are in rolling contact so that a linear movement of the elongated member 12, as the driver, causes the wheel 24, as the follower, to rotate about its pivot. The camming surface 26 of the wheel 24 is toothed, as shown in FIG. 3, while the camming surface portion of the elongated member 12 has annular flanges forming an interlocking arrangement as the camming surfaces engage. It is preferred that the diameter of the camming surface 26 on the wheel element is small compared to the overall diameter of the wheel 24 so that an incremental linear movement of the elongated member 12 causes an amplified displacement of the periphery of the wheel 24. The wheel 24 has markings upon its periphery, as shown in FIG. 3, so that rotational movement of the wheel 24 is readily observed.

A spring 16 is located about the elongated member 12 and acts between the flange 14 of the elongated member 12 and the collar 20 of the mounting base 18. When the unit 10 is mounted to a pivoted storage bin, so that the end of the elongated member 12 opposite the end having the camming surface engages the fixed frame 32, the spring 16 acts between the flange 14 and the collar 20 to support the bin in a tilted position in opposition to the gravitational force acting on the bin. When the bin is filled to capacity, the spring 16 is designed to support the bin at a lower or "full" position of tilt. At a predetermined amount of bin depletion, the spring 16 will have moved the bin about its pivotal axis to a higher or "reload" position of tilt. The spring 16 must be at least strong enough to accomplish this result. Since the weight of a filled bin with certain contents may be different than the weight of a filled bin with different contents, the spring force will need to be changed to produce the desired angular displacement of the bin upon a depletion of contents. The spring 16 may be replaced to provide a spring of suitable strength, but preferably the flange 14 is confined by an adjustable sleeve which may be suitably positioned to the right or left as shown in FIGS. 1 or 2 to alter the strength of the existing spring 16.

The storage bin 30 is suitable for storage of a variable quantity of contents, such as industrial components or the like, and is pivotally supported in a fixed frame structure 32. The axis of pivot of the bin 30 comprises a horizontal line, and permits substantial angular displacement of the center of gravity of the bin relative to the fixed frame structure 32. The storage bin 30, as shown in FIG. 1, has a bottom wall which is preferably inclined away from the fixed structure 32 so that the center of gravity of the bin 30 with components is spaced away from the fixed structure 32. This geometry provides greater bin movement as the quantity of components is depleted. The fixed frame structure 32 may be provided by a fixture such as a storage rack or a warehouse wall.

FIG. 3 is a side view of the unit 10 and the bin 30 in combination as seen from the right of FIG. 1. The bin 30 has a corresponding reference gauge marking 34 adjacent to the markings on the periphery of the wheel 24 so that an angular movement of the wheel 24 may be observed by the displacement of the wheel marking relative to the bin marking 34.

Figure 4:
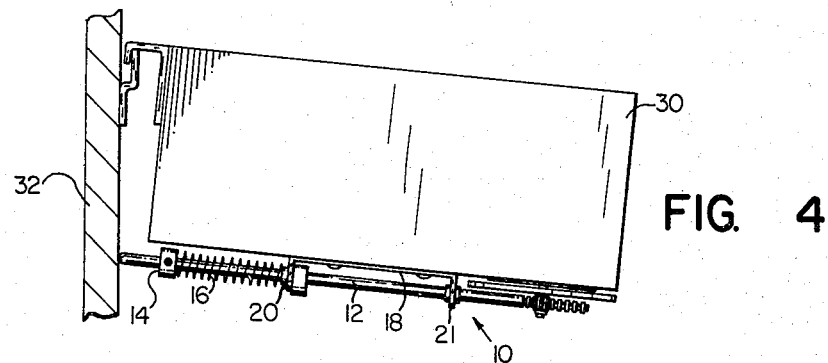
FIG. 4 is a plan view of the depletion indicating mechanism in the embodiment of FIG. 1 holding the bin in one position.
Figure 5:
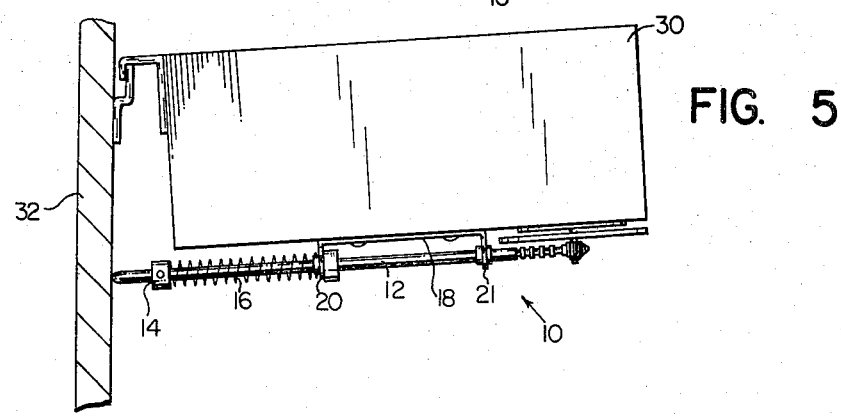
FIG. 5 is a plan view of a depletion indicating mechanism in the embodiment of FIG. 1 holding the bin in another position.

To summarize the operation of the unit 10 when attached in the foredescribed arrangement to the bin 30 and engaging the fixed frame structure 32, the unit 10 holds the bin 30 filled with contents at a low elevation of tilt, as demonstrated in FIG. 4, and forces the bin to a higher position of tilt upon a depletion of bin contents, as demonstrated in FIG. 5. As the spring 16 causes the bin to move to a higher position of tilt, the spring 16 effectively causes the flange 14 and collar 20 to move farther apart. Since the flange 14 is fixed to the elongated member 12 and the collar 20 is fixed to the bin 30, the elongated member 12 must slide within collars 20, 21 as the bin 30 is moved angularly upward. The movement of the bin 30 relative to the elongated member 12 causes the camming surface of the elongated member 12 to rotate the wheel 24 in cooperation with the camming surface 26 of the wheel element. Effectively, the angular displacement of the bin 30 is amplified into angular displacement of the wheel 24, and since the angular displacement of the bin 30 reflects the weight of contents within the bin 30 then the weight of the contents, or more appropriately the quantity of the contents, within the bin 30 is reflected by the angular displacement of the wheel 24. This result will allow for visual observation of the angular displacement of the wheel 24 to quickly determine the bin depletion.

DETAILED DESCRIPTION OF ALTERNATIVE EMBODIMENT

(FIG. 6)

Figure 6:
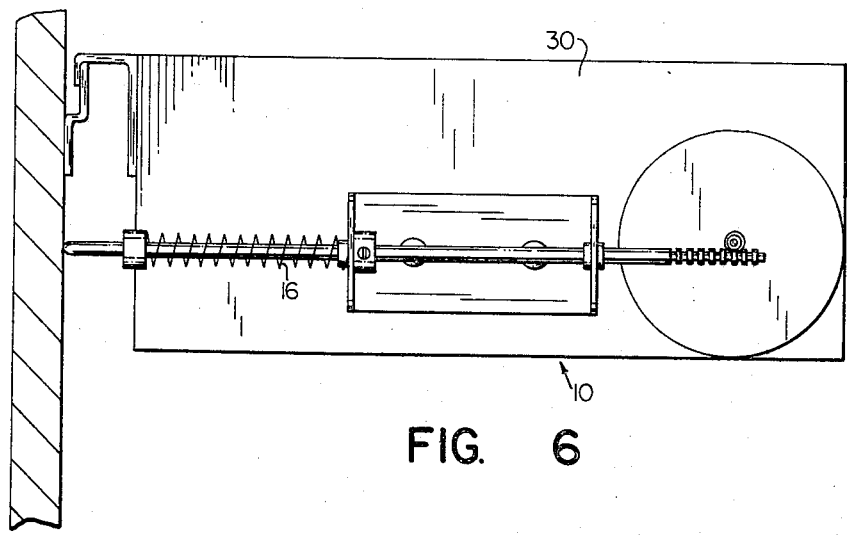
FIG. 6 is a plan view of a depletion indicating mechanism in an alternative embodiment of the present invention.

Instead of fixing the unit 10 to the underside of a pivoted bin 30, the unit 10 may be attached to the side of a bin 30 as demonstrated in FIG. 6. It is only important that the line of force applied by the spring 16 be spaced from the axis of pivot of bin 30, and FIG. 6 is like the previous embodiment in this regard.

The aforementioned descriptions of this invention are mentioned as illustrations and not as limitations.

I claim:

1. In a depletion indicating mechanism for attachment to a storage bin which is pivotally supported above its center of gravity in a fixed frame structure, said indicating mechanism comprising:
    means defining an elongated member, said member having a first and second end and including a flange adjacent the first of said ends,
    a mounting base with collars for slidably receiving said elongated member, said elongated member being slidable along its longitudinal axis,
    a compression spring received loosely about said elongated element and imposing a force between said flange and one of said collars of said base so that when said indicating mechanism is mounted to said storage bin and said first end of said elongated member engages said fixed structure, said spring holds said bin in an upper elevated tilt position in opposition to the gravitational bias of the center of gravity of said bin when said bin is depleted, said spring holding said bin in a lower elevated position when said bin is filled to capacity, and
    means for indicating angular displacement of said bin between said upper and lower elevated positions.

2. A depletion indicating mechanism as defined in claim 1 wherein:
    said flange of said elongated member is defined on a sleeve adjustable to different locations on said elongated member to adjust the force of said spring.

3. A depletion indicating mechanism as defined in claim 1 wherein:
    said means for indicating said displacement includes a wheel rotatably mounted in said bin, said wheel being in engagement with said elongated member to be rotated in response to linear movement of said elongated member, said elongated member including a portion for cooperation with said wheel to cause the wheel to rotate due to said movement of said elongated member.

4. A depletion indicating mechanism as defined in claim 3 wherein:

said wheel has markings upon its periphery so that rotational movement of said wheel is readily observed.

5. A depletion indicating mechanism as defined in claim 3 or 4 wherein:

said wheel includes an element having a camming surface for engaging a complementary shaped camming surface of said elongated member, said wheel camming surface defining teeth which are coaxial to said wheel and at a diameter which is small relative to the diameter of said wheel so that an incremental linear movement of said elongated member cams said wheel to cause an amplified displacement of said wheel periphery.

6. A depletion indicating mechanism, said indicating mechanism comprising:

a fixed frame structure, a bin for storage of a variable quantity of contents, means for pivotally supporting said bin in said frame structure, said means of pivotal support defining a horizontal pivot axis in said frame structure which permits substantial angular displacement of the center of gravity of said bin relative to said frame structure and through a range of angular positions at different bin elevations, said bin being continuously acted upon by the force of gravity toward a lower position in said range of elevated positions, biasing means imposing a continuously-acting force on said bin in opposition to said gravitational force, the magnitude of said continuous force being equal to the gravitational force as the latter force varies directly with the quantity of the contents within said bin, said continuous biasing force having a direction which is generally perpendicular to a vertical plane containing said horizontal piviot axis of said bin and which is vertically spaced from said horizontal axis, means connecting said biasing means to said bin, said connecting means imposing said continuous force on said bin having a length which is variable as said continuous force varies so that said center of gravity of said bin and contents responds to said continuous force and is moved upwardly through said range of different elevated positions as said contents are depleted, and indicating means for providing visual indication of the angular displacement of said bin.

7. A depletion indicating mechanism as defined in claim 6 wherein said direction of said continuous biasing force intersects said vertical plane containing said horizontal pivot axis at some distance below said horizontal pivot axis.

8. A depletion indicating mechanism as defined in claim 6 wherein said biasing means imposing a force on said bin comprises a spring supported by said connecting means.

9. A depletion indicating mechanism as defined in claim 8 further characterized by means for varying the biasing force of said spring to preposition said bin at a desired elevation corresponding to a predetermined combined weight of said bin and any contents thereof.

10. A depletion indicating mechanism as defined in claim 9 wherein said means for indicating bin displacement includes an indicator pivotally supported in said bin and a rigid elongated member slidably supported in said bin, said elongated member having one end engaging said fixed frame structure and an opposite end cooperating with the indicator to pivot the indicator in a first direction during angular displacement of said bin in one direction and to pivot the indicator in the direction opposite said first direction during angular displacement of said bin in the opposite direction.

11. A depletion indicating mechanism as defined in claim 10 wherein:

said indicator has at least one gauge mark and said bin has at least one corresponding reference gauge marking thereon located adjacent said indicator so that displacement of said bin may be observed by the displacement of said indicator mark relative to said bin reference marking.

12. A depletion indicating mechanism as defined in claim 10 wherein said bin defines guide means for slidably supporting said elongated member.

13. A depletion indicating mechanism as defined in claim 12 wherein said biasing means imposing a force on said bin acts between said guide means and said fixed frame structure.

14. A depletion indicating mechanism as defined in claim 12 wherein said biasing means acts on said guide means and a sleeve on said elongated member, said biasing means acting against a flange provided on said elongated member sleeve.

15. A depletion indicating mechanism as defined in claim 6, and wherein said means for indicating bin displacement comprises engaging means, and a mechanical motion amplification means operatively associated with said engaging means.

16. A depletion indicating mechanism as defined in claim 15 wherein said mechanical motion amplification means for indicating the angular displacement of said bin includes an indicator wheel pivotally supported in said bin, and said engaging means comprising a rigid elongated member supported by said bin and extending between said frame structure and said indicator wheel to rotate said indicator wheel in response to angular displacement of said bin.

17. A depletion indicating mechanism as defined in claim 16 wherein said biasing means imposing a force on said bin and acts between said bin and said end of said elongated member in communication with and engaging said fixed frame structure.

* * * * *